(12) United States Patent
Chen et al.

(10) Patent No.: US 12,397,584 B2
(45) Date of Patent: Aug. 26, 2025

(54) ROLLER DEVICE

(71) Applicant: PEM (CHINA) CO., LTD., Jiangsu (CN)

(72) Inventors: Xiaoming Chen, Jiangsu (CN); Zhiqiang Huang, Jiangsu (CN); Wei Xing, Jiangsu (CN); Dapeng Duan, Jiangsu (CN)

(73) Assignee: PEM (CHINA) CO., LTD., Jiangsu (CN)

( * ) Notice: Subject to any disclaimer, the term of this patent is extended or adjusted under 35 U.S.C. 154(b) by 45 days.

(21) Appl. No.: 18/248,868

(22) PCT Filed: Oct. 9, 2021

(86) PCT No.: PCT/CN2021/122758
§ 371 (c)(1),
(2) Date: Apr. 12, 2023

(87) PCT Pub. No.: WO2022/078251
PCT Pub. Date: Apr. 21, 2022

(65) Prior Publication Data
US 2023/0406038 A1    Dec. 21, 2023

(30) Foreign Application Priority Data
Oct. 13, 2020  (CN) .......................... 202022268500.7

(51) Int. Cl.
*B60B 33/00*      (2006.01)

(52) U.S. Cl.
CPC ...... *B60B 33/0005* (2013.01); *B60B 33/0044* (2013.01); *B60B 2310/311* (2013.01); *B60B 2900/112* (2013.01); *B60B 2900/113* (2013.01)

(58) Field of Classification Search
CPC .............. F16C 13/006; B60B 2310/311; B60B 2310/3112; B60B 33/0044; F16B 19/086; F16B 19/06; B21J 15/025
See application file for complete search history.

(56) References Cited

U.S. PATENT DOCUMENTS

| 2005/0111911 A1* | 5/2005 | Zdravkovic ........... B23P 19/062 |
| | | 403/283 |
| 2006/0251489 A1* | 11/2006 | Denham ............... F16B 37/068 |
| | | 411/34 |

(Continued)

FOREIGN PATENT DOCUMENTS

| CN | 1132391 A | 10/1996 |
| CN | 2330235 Y | 7/1999 |

(Continued)

OTHER PUBLICATIONS

International Search Report of PCT/CN2021/122758, mailed on Dec. 16, 2021.

*Primary Examiner* — Kyle A Cook
(74) *Attorney, Agent, or Firm* — Junhe Law Office P.C.; James J. Zhu

(57) ABSTRACT

This application relates to a roller device. The device comprises: a roller; and a roller axle, the roller axle comprises: an axle portion configured to mount the roller such that the roller is rotatable about the axle portion; and a riveting portion at a mounting end of the roller axle with respect to an axial direction of the roller axle, and extending from the mounting end in a direction away from the axle portion, wherein, when the roller device is pressed against a carrier under force, the riveting portion can pierce the carrier such that the roller axle is riveted with the carrier through the riveting portion.

12 Claims, 4 Drawing Sheets

(56) References Cited

U.S. PATENT DOCUMENTS

| | | | | |
|---|---|---|---|---|
| 2007/0104553 A1* | 5/2007 | Philipskotter | ......... | F16B 19/086 |
| | | | | 411/176 |
| 2009/0016656 A1* | 1/2009 | Blair | ................ | F16C 13/006 |
| | | | | 29/898.1 |
| 2010/0232906 A1* | 9/2010 | Singh | ....................... | B21J 15/36 |
| | | | | 411/501 |
| 2012/0180305 A1* | 7/2012 | Bartig | .................. | F16B 19/086 |
| | | | | 411/501 |
| 2013/0294866 A1* | 11/2013 | Singh | ....................... | B21J 15/36 |
| | | | | 411/501 |
| 2016/0238080 A1* | 8/2016 | Wang | .................... | F16C 13/006 |
| 2016/0332215 A1* | 11/2016 | Blacket | ................ | B23K 20/24 |
| 2017/0343026 A1* | 11/2017 | Schaeffer | .............. | F16B 13/066 |
| 2017/0343027 A1* | 11/2017 | Wissling | .................. | B21J 15/36 |
| 2018/0080096 A1* | 3/2018 | Van Hall | ............... | F16B 19/086 |
| 2018/0117666 A1* | 5/2018 | Trinick | .................... | B21K 1/60 |
| 2018/0266465 A1* | 9/2018 | Heger | .................... | B21J 15/025 |
| 2019/0353202 A1* | 11/2019 | Wang | ................. | F16C 33/6696 |
| 2020/0156143 A1* | 5/2020 | Kawasaki | ................ | B21J 15/36 |
| 2021/0207638 A1* | 7/2021 | Bartig | ................. | F16B 19/086 |

FOREIGN PATENT DOCUMENTS

| | | |
|---|---|---|
| CN | 202914521 U | 5/2013 |
| CN | 203938315 U | 11/2014 |
| CN | 204234651 U | 4/2015 |
| CN | 209073800 U | 7/2019 |
| FR | 2552372 A1 | 3/1985 |

\* cited by examiner

ROLLER DEVICE

TECHNICAL FIELD

The present disclosure relates to the field of riveting technologies, and particularly relates to a roller device.

BACKGROUND

Some roller devices need to be mounted on a mobile rack, a cabinet or a similar mobile device to improve the mobility of these mobile devices. However, the existing roller devices are difficult to mount on the mobile device, and holes often need to be punched on the mobile device in advance for mounting, which increases the mounting difficulty and production cost.

Therefore, it is desired to provide a roller device convenient for mounting.

SUMMARY

An objective of the present application is to provide a roller device convenient for mounting.

According to an aspect of the application, a roller device is provided, the device comprises: a roller; and a roller axle, the roller axle comprises: an axle portion configured to mount the roller such that the roller is rotatable about the axle portion; and a riveting portion at a mounting end of the roller axle with respect to an axial direction of the roller axle, and extending from the mounting end in a direction away from the axle portion, wherein, when the roller device is pressed against a carrier under force, the riveting portion can pierce the carrier such that the roller axle is riveted with the carrier through the riveting portion.

In some embodiments of the application, the riveting portion and the axle portion do not overlap with each other in the axial direction of the roller axle.

In some embodiments of the application, the roller axle further comprises a flange between the axle portion and the riveting portion, wherein the flange is configured to prevent the roller from contacting the carrier when the roller device is riveted with the carrier.

In some embodiments of the application, the axle portion comprises an annular positioning mechanism extending around the axle portion, wherein the annular positioning mechanism is configured to prevent the roller from moving in the axial direction.

In some embodiments of the application, the annular positioning mechanism protrudes from a surface of the axle portion.

In some embodiments of the application, the annular positioning mechanism is recessed from a surface of the axle portion.

In some embodiments of the application, the annular positioning mechanism is aligned with an axially central position of the roller.

In some embodiments of the application, the roller is pre-mounted on the roller axle.

In some embodiments of the application, the axle portion extends at least beyond the roller in the axial direction of the roller axle.

In some embodiments of the application, the riveting portion comprises at its free end a wedge-shaped section which is substantially parallel to the axial direction of the roller axle, wherein the wedge-shaped section flares when the roller device is pressed against the carrier.

In some embodiments of the application, the riveting portion comprises at its free end a mounting section which is perpendicular to the axial direction of the roller axle, wherein an outer periphery of the mounting section has a regular polygonal shape.

In some embodiments of the application, the mounting section has an inner periphery of a regular polygonal shape, wherein each face of the inner periphery is parallel to a face of the outer periphery.

In some embodiments of the application, the mounting section has an inner periphery of a circular shape.

In some embodiments of the application, the riveting portion comprises at its free end a mounting section which is perpendicular to the axial direction of the roller axle, and wherein the mounting section has an outer periphery of a circular shape.

The foregoing is an overview of the present application, which may simplify, summarize, and omit details. Those skilled in the art will appreciate that this section is merely illustrative and not intended to limit the scope of the present application in any way. This summary section is neither intended to identify key features or essential features of the claimed subject matter nor intended to act as an auxiliary means for determining the scope of the claimed subject matter.

BRIEF DESCRIPTION OF THE DRAWINGS

The foregoing and other features of the present application will be more fully understood from the following description and the appended claims taken in conjunction with the accompanying drawings. It is to be understood that these drawings depict only a few embodiments of the contents of the present application and should not be construed as limiting the scope of the present application. The contents of the present application will be illustrated more clearly and in more detail with the accompanying drawings.

DETAILED DESCRIPTION

Figure 1:
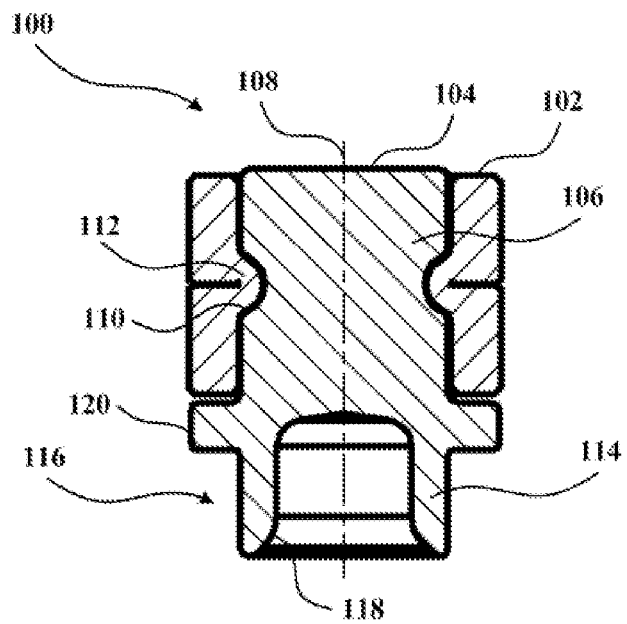
FIG. 1 depicts a roller device 100 according to an embodiment of the present application.

In the following detailed description, reference is made to the accompanying drawings which form a part hereof. In the drawings, similar reference numerals generally refer to similar parts unless the context clearly dictates otherwise. The illustrative embodiments described in the detailed description, drawings and claims are not intended to be limiting. Other embodiments may be employed, and other changes may be made without departing from the spirit or scope of the subject matter of the present application. It is to be understood that various configurations, substitutions, combinations, and designs of the various forms of the present application, which are generally described in this application and are illustrated in the drawings, are intended to constitute a part of the present application.

FIG. 1 depicts a roller device 100 according to an embodiment of the present application. In some embodiments, the roller device 100 can be mounted on a carrier, such as a metal plate, or other similar structures that can undergo plastic deformation.

As shown in FIG. 1, the roller device 100 includes a roller 102, which can be made of rubber, plastic, metal or other materials. The roller device 100 also includes a roller axle 104. The roller 102 is mounted on the roller axle 104, so that the roller 102 is rotatable about an axle portion 106 of the roller axle 104. In some embodiments, the roller 102 can be pre-mounted on the roller axle 104, so that the roller device 100 can be provided as an integrated assembly. In other embodiments, the roller 102 can also be provided separately from the roller axle 104, which can be mounted on the roller axle 104 before or after the roller device 100 is mounted on the carrier.

The axle portion 106 is configured as an extension structure with a central axis 108, which is coaxial with a rotational axis of the roller 102. In some embodiments, the axle portion 106 extends at least beyond the roller 102 in the axial direction of the roller axle 104. In other words, the axial length of the axle portion 106 is greater than that of the roller 102. In some other embodiments, the axial length of the roller 102 may also be shorter than or equal to that of the axle portion 106.

In some embodiments, the axle portion 106 has an annular positioning mechanism 110, which can be arranged approximately near a central position of the axle portion 106. Preferably, the annular positioning mechanism 110 can be aligned with the axially central position of the roller 102. The annular positioning mechanism 110 may extend a certain angle around the axle portion 106, such as 360 degrees or less. In some embodiments, the annular positioning mechanism 110 may be a continuous and complete ring, that is, extend 360 degrees, or may also include a plurality of separated positioning segments arranged around the axle portion. The annular positioning mechanism 110 can cooperate with the roller 102 to prevent the roller from moving on the axle portion 106 in an axial direction. In some embodiments, the annular positioning mechanism 110 can protrude from the surface of the axle portion 106. Accordingly, the inner periphery of the roller 102 can be provided with an annular groove 112 matching with the annular positioning mechanism 110. In other alternative embodiments, the annular positioning mechanism 110 may be recessed from the surface of the axle portion 106. Accordingly, the inner periphery of the roller 102 can be provided with an annular protrusion matching with the annular positioning mechanism 110. In some embodiments, the axle portion 106 may include a plurality of annular positioning mechanisms 110, which are spaced in the axial direction on the axle portion 106. The plurality of annular positioning mechanisms 110 can better prevent the roller 102 from moving in the axial direction. In some embodiments, the axial movement of the roller 102 can also be prevented by other positioning structures. For example, a pair of flanges (not shown) can be formed on the axle portion and at two sides of the roller, and the distance of the pair of flanges in the axial direction is roughly equal to or slightly greater than an axial length of the inner periphery of the roller. The protruded height of the pair of flanges from the axle portion can be greater than or equal to the thickness of the roller in a radial direction, or shorter than the thickness of the roller in the radial direction.

The roller axle 104 also includes a riveting portion 114, which is located at a mounting end 116 of the roller axle 104 with respect to an axial direction of the roller axle. The mounting end 116 is one of the two ends of the roller axle 104 in the axial direction away from the roller 102. The riveting portion 114 may extend from the mounting end 116 in a direction away from the shaft portion 106. When the roller device 100 is pressed against a carrier under force, the riveting portion 114 can pierce the carrier so that the roller axle 104 is riveted with the carrier through the riveting portion 114. In some embodiments, the riveting portion 114 has a substantially cylindrical shape, and the riveting portion 114 includes a wedge-shaped section 118 at its free end, which is substantially parallel to the axial direction of the roller axle 104. The wedge-shaped section 118 is configured to flare, when the roller device 100 is pressed against the carrier, so as to realize the riveting between the roller device 100 and the carrier. In some embodiments, the wedge-shaped section 118 can have an outward sloping surface. When the roller device 100 is being mounted, the sloping surface can resolve the pressure force into a radial outward force partially, so that the riveting portion 114 can fully flare.

In some embodiments, the riveting portion 114 and the axle portion 106 do not overlap with each other in the axial direction of the roller axle 104, that is, the roller 102 cannot be mounted on the riveting portion 114. Since the riveting portion 114 may deform during the mounting of the roller device 100, the riveting portion 114 and the roller 102 relatively separated can avoid the limited rolling performance of the roller 102 due to the deformation of the riveting portion 114 (especially the expansion) after mounting. In some embodiments, the roller axle 104 also includes a flange 120 located between the axle portion 106 and the riveting portion 114, which is used to prevent the roller 102 from contacting the carrier when the roller device 100 is riveted with the carrier.

Figure 2:
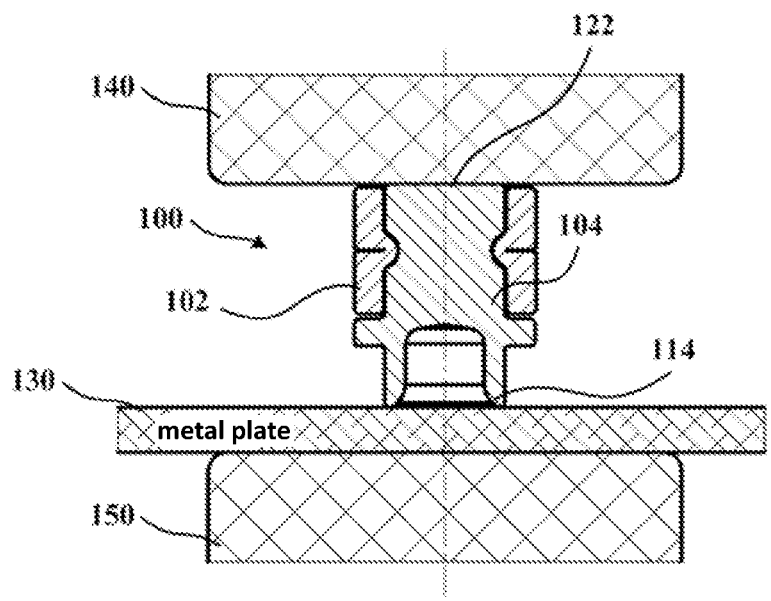
FIG. 2 to FIG. 4 depict a process of mounting the roller device 100 shown in FIG. 1 on a carrier by riveting.
Figure 3:
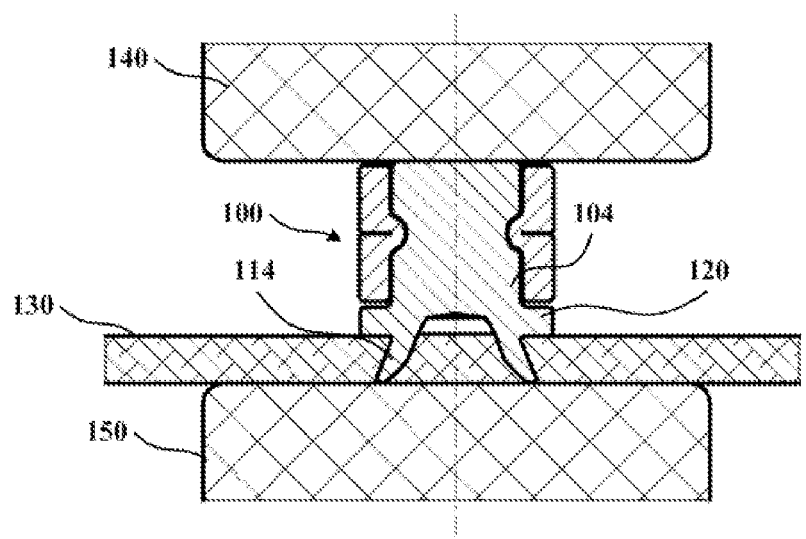
Figure 4:
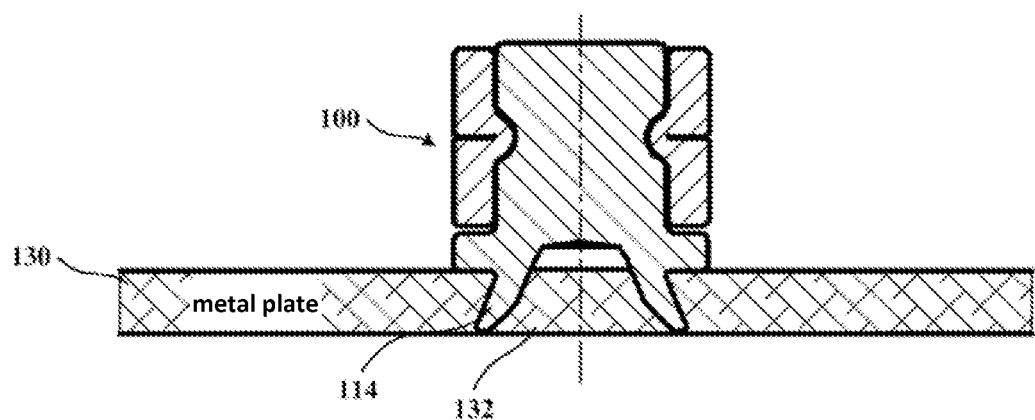

FIG. 2 to FIG. 4 depict a process of mounting the roller device 100 shown in FIG. 1 on a carrier by riveting.

As shown in FIG. 2, the mounting process starts with placing the roller device 100 on a side of the carrier 130. In some embodiments, the carrier 130 can be provided with preformed through-holes or depressions (not shown in the figure), whose section shape and size on a plane perpendicular to the axial direction of the roller axle 104 substantially correspond to the shape and size of the end of the riveting portion 114. Providing the through-holes or depressions improves the accuracy of the mounting of the roller device 100. However, it can be understood that the roller device 100 according to an embodiment of the present application does not require through-holes or depressions to be provided on the carrier 130 in advance. As shown in FIG. 2, the carrier 130 can generally be in the form of a flat structure. Since it is not desired to arrange the through-holes or depressions on the carrier 130 as guiding structures for mounting, the roller device 100 can be mounted on the carrier of various shapes, which greatly enlarges the application of the roller device 100.

In order to mount the roller device 100, an upper loading tool 140 and a lower supporting tool 150 are respectively arranged on both sides of the roller 102 and the carrier 130, which can move relatively to provide a pressure force to the roller device 100. When mounting the roller device 100, since the riveting portion 114 of the roller device 100 can pierce the carrier 130 and penetrate into the inside of the carrier 130, the lower support tool 150 does not need to be preformed as a mold for the riveting portion 114, but only needs to provide a supporting plane on a side close to the carrier 130. On the other hand, during the mounting process, the upper loading tool 140 can contact a supporting end 122 of the roller axle 104, which is opposite to the mounting end 116, and apply a pressure force to the roller axle 104 through the supporting end 122. In the example shown in FIG. 2, the supporting end 122 of the roller axle 104 extends beyond the roller 102, so the roller 102 may not be subjected to the pressure force applied by the upper loading tool 140 during mounting, which can avoid an axial movement of the roller 102 on the roller axle 104.

Still referring to FIG. 3, the upper loading tool 140 and the lower supporting tool 150 move relatively and apply a pressure force to the roller axle 104, which makes the riveting portion 114 continue to enter the inside of the carrier 130. At this time, the riveting portion 114 undergoes plastic deformation and flares under force, and there is a relatively maximum outward expansion distance at its end, so that it is riveted in the carrier 130. It can be seen that during the mounting process, the flange 120 can limit a depth of the roller axle 104 entering the carrier 130, thus acting as a stop member for mounting.

Referring to FIG. 4, after mounting, the upper loading tool and the lower supporting tool can be removed, and only the carrier 130 and the roller device 100 that are riveted to each other are retained. The carrier portion 132 inside the riveting portion 114 can remain on the carrier 130 after mounting, which can improve the riveting strength and protect the riveting portion 114.

In combination with FIG. 2 and FIG. 3, at the beginning of the mounting of the roller device 100, the riveting portion 114 of the roller device 100 applies a force on the carrier 130, which acts as a blanking tool to form riveting holes on the carrier 130. Then, as the riveting portion 114 continues to move towards the carrier 130 under the force, depending on the initial shape of the riveting portion 114, the carrier 130 will apply a reaction force on the riveting portion 114, which causes the riveting portion 114 to produce expanded plastic deformation, thus forming a solid mechanical interlock structure between the roller device 100 and the carrier 130. This self-punching does not require punching on the carrier in advance, so its mounting process has substantially no damage to the carrier with coating or cladding on the surface, which can improve a service life of the mechanical structure after mounting.

Figure 5:
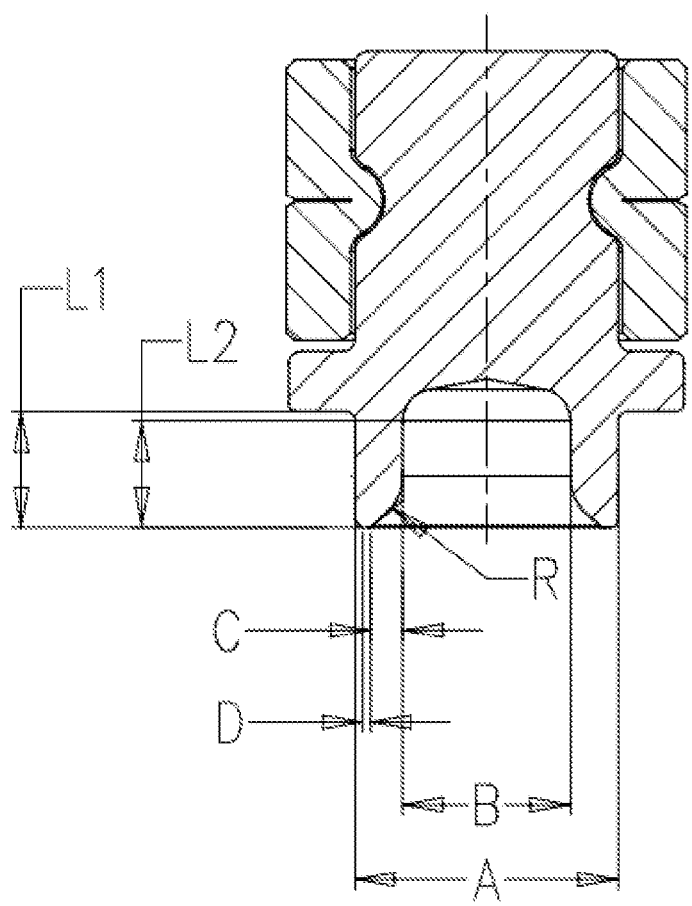
FIG. 5 depicts an enlarged view of the roller device 100 shown in FIG. 1.

FIG. 5 depicts an enlarged view of the roller device 100 shown in FIG. 1. As previously described in combination with FIG. 2 and FIG. 3, the initial shape and structure of the riveting portion have an important impact on the strength after mounting. In the embodiment shown in FIG. 5, the wedge-shaped section at the end of the riveting portion includes an inclined plane close to the inside of the riveting portion. In some embodiments, the inclined plane has an angle of about 35 to 80 degrees (relative to a surface plane close to a mounting position of the carrier), preferably 45 to 70 degrees, and more preferably 45 to 60 degrees. At the outermost side of the inclined plane along the axial direction, that is, the position where the initial contact with a mounting surface of the carrier happens when mounting the roller device, the wedge-shaped section can have a contact end surface with a radial width (parameter D in FIG. 5), which is, for example, 0-0.5 mm, preferably 0.1 to 0.3 mm. The existence of the radial width can improve the mechanical strength of the end of the riveting portion, but may not significantly increase a resistance of the riveting portion when piercing into the carrier.

In the example shown in FIG. 5, the end of the riveting portion is also provided with a fillet surface, which is located at the outermost side of the riveting portion in the radial direction. The fillet surface and the inclined surface clamp the contact end surface between them, but the fillet surface can have a smaller radial width compared with the radial width C of the inclined surface (in FIG. 5, it is represented as the difference between the half of the difference between the outer diameter and the inner diameter of the riveting portion (A−B)/2 and the radial width (C+D)), so that after mounting, radial forces of the riveting portion of the roller device are unbalanced, and the riveting portion flares as a whole.

In order to firmly fix the riveting portion in the carrier, the riveting portion also has a predetermined axial length. It can be understood that the axial length depends on the thickness of the carrier on the one hand, and on the plastic deformation of the riveting portion after mounting on the other hand. In some embodiments, the axial length L1 of the riveting portion (starting from a side of the flange close to the carrier in FIG. 5) is substantially equal to the sum of the thickness of the carrier and 10% to 50% of the outer diameter A of the riveting portion, preferably equal to the sum of the thickness of the carrier and 20% to 40% of the outer diameter A of the riveting portion. This parameter configuration can allow the riveting portion to substantially expose from a non-mounting surface of the carrier or basically to reach the non-mounting surface of the carrier after mounting. It can be understood that in some other embodiments, the riveting portion can also have an axial length smaller than the thickness of the carrier. In the example shown in FIG. 5, an arc transition can be provided between the riveting portion and the flange, and its axial length to the end of the riveting portion is L2.

The mechanical connection strength of the roller device shown in the embodiment of this application is significantly better than that of the roller device with a common riveting structure or similar connectors. According to the inventor's test results, when mounting on a metal plate of the same thickness and material, in order to achieve the same connection strength, the outer diameter of the riveting portion of the roller device according to an embodiment of the present application can be half of that of the existing common riveting connection structure (the riveting portion does not flare significantly).

Figure 6:
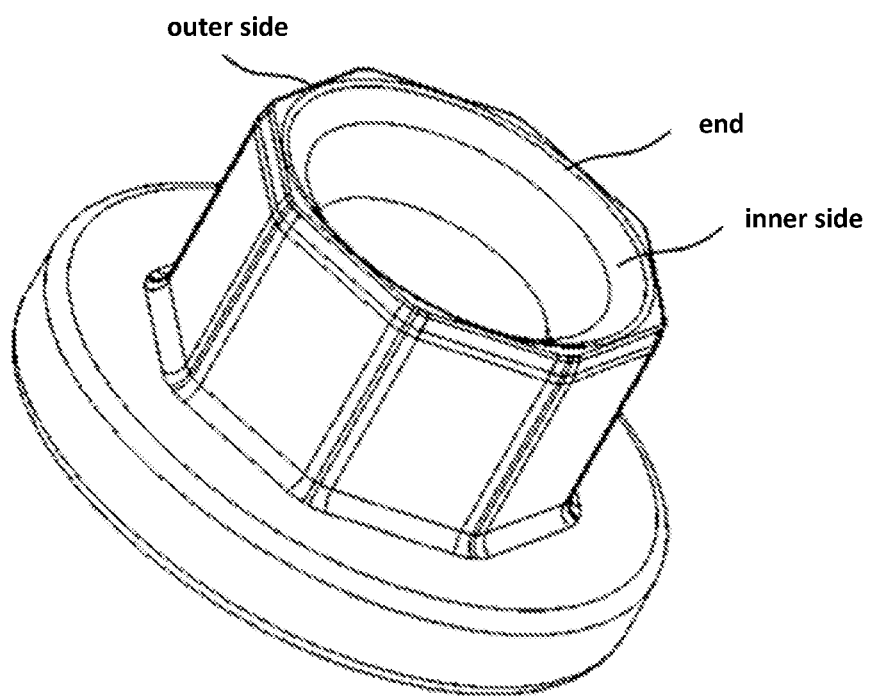
FIG. 6 depicts a perspective view of a riveting portion in the roller device according to an embodiment of the present application.

FIG. 6 depicts a side view of a riveting portion in the roller device according to an embodiment of the present application. In some embodiments, the riveting portion has a mounting section at its free end that is perpendicular to the axial direction of the roller axle. That is, the mounting section is substantially parallel to the carrier to be mounted. In some embodiments, an outer periphery of the mounting section has a regular polygonal shape. In some examples, an inner periphery of the mounting section have a circular shape, as shown in FIG. 6. In other examples, the inner periphery of the mounting section can have a regular polygonal shape, and each face of the inner periphery is parallel to a face of the outer periphery. Alternatively, the outer periphery of the mounting section can also have a circular shape, that is, the riveting portion has a substantially cylindrical shape.

It should be noted that although several modules or submodules for the roller device have been mentioned in the above detailed description, such division is exemplary and not mandatory. Practically, according to the embodiments of the present application, the features and functions of two or more modules described above can be embodied into one module. In contrast, the features and functions of a module described above can be further divided into multiple modules to be embodied.

Those skilled in the art can understand and implement other variations to the disclosed embodiments from a study of the specification, the disclosure and accompanying drawings, and the appended claims. In the claims, the word "comprising" does not exclude other elements or steps, and the indefinite article "a" or "an" does not exclude a plurality. In applications according to present application, one element may conduct functions of several technical feature recited in claims. Any reference numerals of the drawings in the claims should not be construed as limiting the scope.

What is claimed is:

1. A roller device, the device comprising:
   a roller; and
   a roller axle, the roller axle comprising:
   an axle portion configured to mount the roller such that the roller is rotatable about the axle portion; and
   a riveting portion at a mounting end of the roller axle, wherein the mounting end of the roller axle is one of the two ends of the roller axle along an axial direction of the roller axle, and the riveting portion extends from the mounting end in a direction away from the axle portion, wherein the riveting portion comprises, at its free end, an inclined surface, a contact end surface, and a fillet surface extending from the inside to the outside, and the radial width of the fillet surface is smaller than the radial width of the inclined surface; and wherein, when the roller device is pressed against a carrier under force, the riveting portion can pierce the carrier such that the roller axle is riveted with the carrier through the riveting portion;
   wherein the riveting portion and the axle portion do not overlap with each other in the axial direction of the roller axle;
   wherein the axle portion comprises an annular positioning mechanism extending around the axle portion, wherein the annular positioning mechanism is configured to prevent the roller from moving in the axial direction.

2. The roller device of claim 1, wherein the roller axle further comprises a flange between the axle portion and the riveting portion, wherein the flange is configured to prevent the roller from contacting the carrier when the roller device is riveted with the carrier.

3. The roller device of claim 1, wherein the annular positioning mechanism protrudes from a surface of the axle portion.

4. The roller device of claim 1, wherein the annular positioning mechanism is recessed from a surface of the axle portion.

5. The roller device of claim 1, wherein the axle portion extends at least beyond the roller in the axial direction of the roller axle.

6. The roller device of claim 1, wherein the free end of the riveting portion forms a wedge-shaped section which is substantially parallel to the axial direction of the roller axle, wherein the wedge-shaped section flares when the roller device is pressed against the carrier.

7. The roller device of claim 1, wherein the free end of the riveting portion forms a mounting section which is perpendicular to the axial direction of the roller axle, and wherein the mounting section has an outer periphery of a circular shape.

8. The roller device of claim 1, wherein the annular positioning mechanism is aligned with an axially central position of the roller.

9. The roller device of claim 8, wherein the roller is pre-mounted on the roller axle.

10. The roller device of claim 1, wherein the free end of the riveting portion forms a mounting section which is perpendicular to the axial direction of the roller axle, wherein an outer periphery of the mounting section has a regular polygonal shape.

11. The roller device of claim 10, wherein the mounting section has an inner periphery of a regular polygonal shape, wherein each face of the inner periphery is parallel to a face of the outer periphery.

12. The roller device of claim 10, wherein the mounting section has an inner periphery of a circular shape.

* * * * *